United States Patent
Paterik

(10) Patent No.: US 7,603,433 B1
(45) Date of Patent: *Oct. 13, 2009

(54) IMS-BASED INTERACTIVE MEDIA SYSTEM AND METHOD

(75) Inventor: Thomas Paterik, Kansas City, MO (US)

(73) Assignee: Sprint Spectrum, L.P., Overland Park, KS (US)

( * ) Notice: Subject to any disclaimer, the term of this patent is extended or adjusted under 35 U.S.C. 154(b) by 277 days.

This patent is subject to a terminal disclaimer.

(21) Appl. No.: 11/282,407

(22) Filed: Nov. 18, 2005

Related U.S. Application Data

(63) Continuation-in-part of application No. 10/414,545, filed on Apr. 15, 2003.

(51) Int. Cl.
*G06F 15/16* (2006.01)

(52) U.S. Cl. ............... 709/217; 709/203; 709/201; 709/223; 709/226; 370/352; 370/353; 379/88.18; 379/93.17; 379/90.01

(58) Field of Classification Search .......... 709/217
See application file for complete search history.

(56) References Cited

U.S. PATENT DOCUMENTS

| | | | |
|---|---|---|---|
| 5,964,839 A * | 10/1999 | Johnson et al. ........... 709/224 |
| 2002/0032564 A1* | 3/2002 | Ehsani et al. ............. 704/235 |
| 2002/0085705 A1* | 7/2002 | Shires ................. 379/265.04 |
| 2002/0169615 A1* | 11/2002 | Kruger et al. ............ 704/270.1 |
| 2004/0204095 A1 | 10/2004 | Cyr et al. |
| 2005/0058125 A1 | 3/2005 | Mutikainen et al. |
| 2005/0113062 A1 | 5/2005 | Pelaez et al. |
| 2005/0157855 A1 | 7/2005 | Pelaez et al. |

OTHER PUBLICATIONS

Eric Burger and Greg Pisano, Brooktrout Technology, "MSCML Protocol: The Key to Unlocking a New Generation of Multimedia SIP Services," White Paper, Jul. 2005.

Convedia, "Overview of Convedia's IETF Drafts on Media Sessions Markup Language (MSML) and Media Object Markup Language (MOML)," Version 1.1, White Paper, Oct. 2003.

Convedia, "IP Media Servers in Wireless Networks," Version 1.0, White Paper, Feb. 2004.

Convedia, "Media Server Control Protocols: The Advantages of SIP over the Media Gateway Control Protocols," Draft v0.2, White Paper, 2005.

J. Van Dyke et al., "Media Server Control Markup Language (MSCML) and Protocol," Internet Draft, Dec. 25, 2004.

(Continued)

*Primary Examiner*—Jude J Jean Gilles

(57) ABSTRACT

An interactive media system for an IP Multimedia Subsystem (IMS) architecture includes a media resource function processor (MRFP) and a media resource function controller (MRFC). The MRFP includes media resources, such as automatic speech recognition (ASR) engines and text-to-speech (TTS) engines, and a voice browser. A caller places a call to a telephone number to reach an interactive media service, and the MRFC establishes a real-time packet media session between the media gateway and the MRFP. The voice browser queries a location server to determine the location of an interactive application associated with the called telephone number and then queries an application server corresponding to the location to obtain the interactive application as a voice extensible markup language (VXML) document. The browser interprets the VXML document and responsively invokes the media resources, via the MRFC, to provide the interactive media service to the caller.

12 Claims, 3 Drawing Sheets

OTHER PUBLICATIONS

A. Saleem et al., "Media Objects Markup Language (MOML)," Internet Draft, Oct. 21, 2005.
A. Saleem et al., "Media Sessions Markup Language (MSML)," Internet Draft, Oct. 21, 2005.
S. Shanmugham, "Media Resource Control Protocol Version 2 (MRCPv2)," Internet Draft, Oct. 23, 2005.
World Wide Web Consortium, "Voice Extensible Markup Language (VoiceXML) Version 2.0," W3C Recommendation, Mar. 16, 2004.
Grant Henderson, "IMS: The Catalyst For Service Convergence Across Wireless & Wireline Networks," Internet Telephony, Feb. 2005.
Lucent Technologies, "IP Multimedia Subsystem (IMS) Service Architecture," White Paper, 2004.
$3^{rd}$ Generation Partnership Project, "IP Multimedia Subsystem (IMS)," Technical Specification, 3GPP TS 23.228 v7.1.0 (Sep. 2005).

* cited by examiner

IMS-BASED INTERACTIVE MEDIA SYSTEM AND METHOD

CROSS-REFERENCE TO RELATED APPLICATION

This application is a continuation-in-part of U.S. application Ser. No. 10/414,545, filed Apr. 15, 2003, which is incorporated herein by reference.

BACKGROUND

1. Field of the Invention

The present invention relates to telecommunications and, more particularly, to an interactive media system and method within an IP Multimedia Subsystem (IMS) architecture.

2. Description of Related Art

Many telecommunications networks and other enterprises provide interactive media services, e.g., audio services, that users can access by telephone. An interactive audio system typically receives a call from a user, receives audio input from the user, such as speech or DTMF tones, and responsively provide the user with services, such as information, voice mail access, e-mail access, Web browsing, voice activated dialing (VAD), or the ability to do banking or other transactions. An interactive voice response (IVR) system is an example of an interactive audio system. Traditionally, such interactive audio systems have been highly integrated, often with proprietary architectures, making the systems difficult to modify so as to increase capacity or to provide new services.

A distributed interactive media system has been described in U.S. application Ser. No. 10/414,545. The distributed media system described therein includes media resources, such as automatic speech recognition (ASR) engines and text-to-speech (TTS) engines that process media in a real-time packet format, under the control of a resource manager. An interactive application could be written in a predetermined format, e.g., such as a voice extensible markup language (VXML) document, and a voice browser in the distributed media system could interpret the VXML document and responsively invoke media resources, via the resource manager, to provide interactive media services to the caller. By using a distributed architecture and publicly available "open standard" protocols, the distributed interactive media system could be more easily updated than a traditional, highly integrated IVR.

However, the IP Multimedia Subsystem (IMS) architecture promulgated by the 3$^{rd}$ Generation Partnership Project (3GPP) is becoming increasingly influential. Relevant aspects of the IMS architecture are described in 3$^{rd}$ Generation Partnership Project, "Technical Specification Group Services and System Aspects," 3GPP TS 23.228 v7.1.0 (2005-09), which is incorporated herein by reference. The IMS architecture specifies a multimedia resource function (MRF) that is split into a multimedia resource function controller (MRFC) and a multimedia resource function processor (MRFP). The IMS architecture further specifies that sessions are controlled by a call session control function (CSCF), in accordance with service logic in an application server (AS). These aspects of the IMS architecture are summarized in FIG. 1.

With reference to FIG. 1, the MRFP controls bearer media streams on the Mb reference point and provides resources to be controlled by the MRFC. The IMS architecture also specifies other tasks of the MRFP, including media stream sourcing (e.g., for multimedia announcements) and media stream processing (e.g., audio transcoding and media analysis). The tasks of the MRFC include (i) controlling the media resources in the MRFP and (ii) interpreting information from the AS and CSCF and controlling the MRFP accordingly. The IMS architecture also suggests using the Session Initiation Protocol (SIP) for the Mr reference point and H.248 for the Mp reference point.

Thus, the IMS architecture contemplates a "top-down" approach in which service logic in the AS controls the MRFP via the CSCF and the MRFC. This approach can create difficulties, however, when the MRFP is used to provide certain interactive media services that IVRs currently provide. In particular, some interactive media services may be facilitated by allowing the MRFP to initiating actions, instead of simply carrying out commands. Similarly, the protocols that the IMS architecture specifies for controlling the MRFP, i.e., SIP and H.248, are not well suited for controlling MRFP so as to provide interactive media services to callers.

Accordingly, there is a need to provide an interactive media system that can work within the IMS architecture.

SUMMARY

In a first principal aspect, an exemplary embodiment of the present invention relates to an interactive media system comprising a location server, an application server, a media resource controller, at least one media resource, and a browser. The location server stores a location of an interactive application. The application server stores the interactive application, in a predetermined format, at that location. The browser obtains the location from the location server and obtains the application in the predetermined format from the application server. The browser interprets the interactive application in the predetermined format and responsively invokes the at least one media resource via the media resource controller.

In a second principal aspect, an exemplary embodiment of the present invention relates to a method of providing an interactive media service. In accordance with the method, a media resource processor receives at least one call identifier and obtains an interactive application based on the at least one call identifier. A media resource controller establishes a real-time packet media session with the media resource processor. The media resource processor interprets the interactive application and responsively sends messages to the media resource controller. The media resource controller controls the media resource processor during the real-time packet media session in accordance with the messages.

DETAILED DESCRIPTION OF EXEMPLARY EMBODIMENTS

1. Overview

Figure 1:
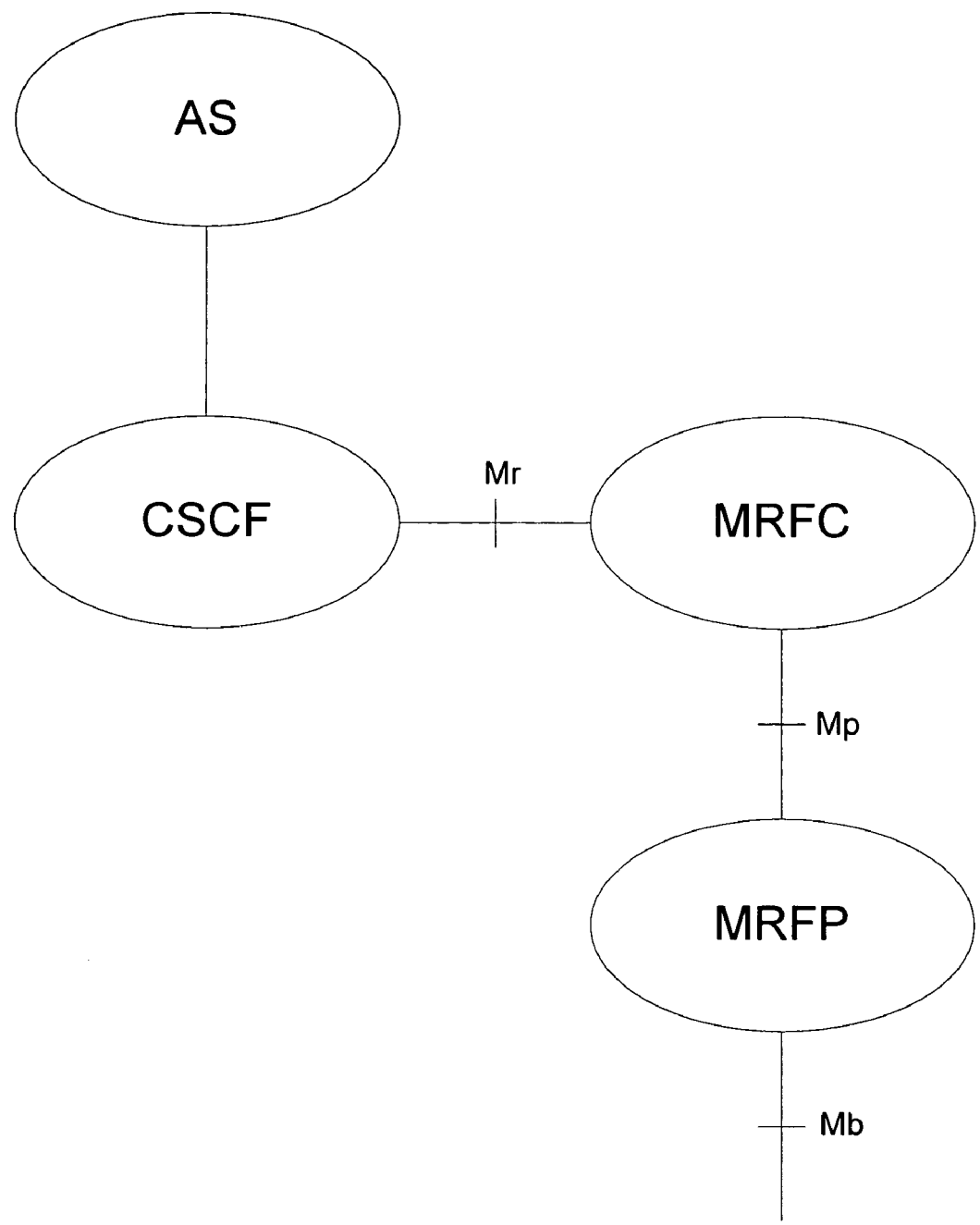
FIG. 1 is a block diagram illustrating a prior art IMS architecture.

The present invention, in exemplary embodiments, provides an interactive media system, within an IMS architecture, for providing interactive media services to callers. In some cases, the caller may use a conventional telephone, e.g., a POTS telephone, to access the interactive media service. In other cases, the caller may access the interactive media service using other types of devices, such as fax machines, wireless telephones, personal digital assistants (PDAs), personal computers, or laptop computers. The interactive media service may involve audio, such as receiving speech or DTMF tones from the user and/or transmitting speech to the user. The interactive media service may also involve video and/or other media. In some cases, the interactive media service may be multi-modal, i.e., may involve different media types. For example, a user may transmit speech, and the interactive media service may respond with graphics. The interactive media service may also involve voice activated dialing (VAD), voice Web browsing, data exchange, and/or handwriting recognition.

In accordance with the IMS architecture, the interactive media system may include a media resource function processor (MRFP) and a media resource function controller (MRFC). The MRFP includes one or more media resources. Such media resources may include automatic speech recognition (ASR) engines, text-to-speech (TTS) engines, and/or other media resources. The media resources may process voice or other media in a real-time packet format, e.g., using the real-time transport protocol (RTP). Relevant aspects of RTP are described in Schulzrinne, et al., "RTP: A Transport Protocol for Real-Time Applications," Request for Comments 1889 (January 1996), which is incorporated herein by reference.

The MRFP may also include a voice browser that interprets an interactive application and responsively invokes media resources in the MRFP, via the MRFC, to provide an interactive service to the caller. The interactive application could be written, for example, as a voice extensible markup language (VXML) document. A recent version of VXML is described in World Wide Web Consortium, "Voice Extensible Markup Language (VoiceXML) Version 2.0," W3C Recommendation 14 Mar. 2004, which is incorporated herein by reference. The voice browser may obtain the interactive application, e.g., as a VXML document, using the HyperText Transfer Protocol (HTTP). A recent version of HTTP is described in R. Fielding et al., "Hypertext Transfer Protocol—HTTP/1.1," Request for Comments 2616 (June 1999), which is incorporated herein by reference.

To invoke media resources in accordance with the interactive application, the MRFP may send messages to the MRFC. The messages may conform to a protocol, such as the Media Resource Control Protocol (MRCP). A recent version of MRCP is described in S. Shanmugham, "Media Resource Control Protocol Version 2 (MRCPv2)," Internet Draft, Oct. 23, 2005, which is incorporated herein by reference. The MRFC may then control the media resources in accordance with the messages from the MRFP. For example, the MRFC may use the Session Initiation Protocol (SIP) and Session Description Protocol (SDP) to establish sessions with the appropriate media resources in the MRFP and then control the media resources based on the messages from the MRFP, e.g., using MRCP. A recent version of SIP is described in J. Rosenberg et al., "SIP: Session Initiation Protocol," Request for Comments 3261 (June 2002), which is incorporated herein by reference. A recent version of SDP is described in M. Handley et al., "SDP: Session Description Protocol," Request for Comments 2327 (April 1998), which is incorporated herein by reference. The MRFP may also send messages to the MRFC (e.g., using MRCP) to indicate the occurrence of events, such as the completion of a speech recognition task.

The interactive media system may have access to a plurality of different interactive applications to provide a plurality of different interactive media services. For example, a caller may call a telephone number to access a particular interactive media service, and the interactive media system may obtain an appropriate interactive application to provide that interactive media service based on an identifier of the call. The call identifier could be the called telephone number, the originating telephone number, a trunk group, or some other identifier of the user's call. The interactive media server may then use the call identifier to obtain the interactive application from another network element, such as an application server, optionally with the aid of a location server.

For example, in accordance with the IMS architecture, a caller may call a telephone number associated with an interactive media service via the public switched telephone network (PSTN). A media gateway control function (MGCF) may receive SS7 signaling to route the call to a media gateway under its control. In response to the SS7 signaling, the MGCF may signal to a call session control function (CSCF), e.g., using SIP. The CSCF may then signal to the MRFC, which may, in turn, signal to the MRFP, e.g., using SIP, to set up a real-time packet media session between the MG and the MRFP. The MRFP may receive the call identifier in the SIP signaling and then use the call identifier to obtain the interactive application, e.g., as a VXML document, from an application server. The MRFP may then interpret the VXML document and responsively invoke media resources through the MRFC.

2. Exemplary Architecture

Figure 2:
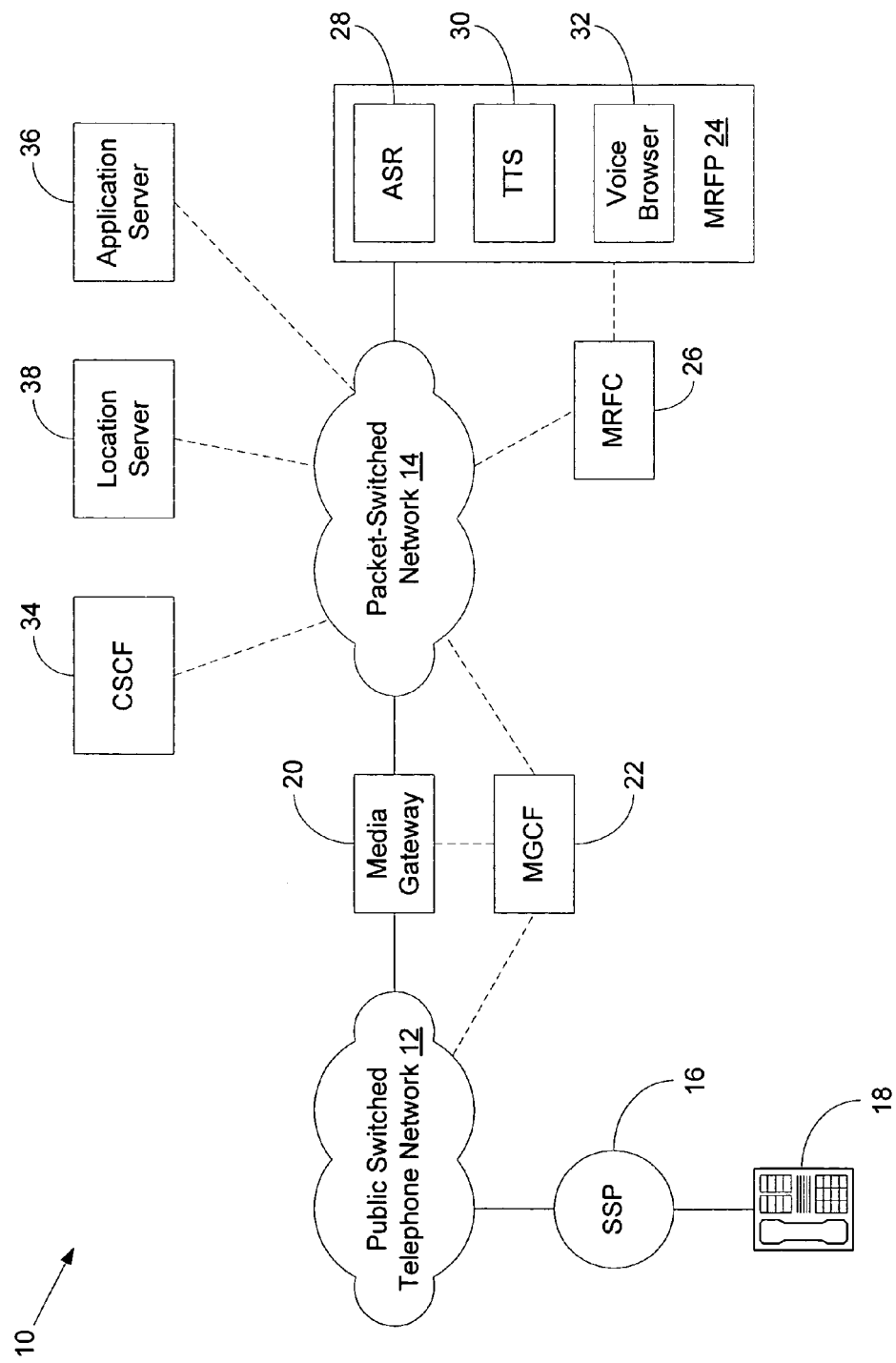
FIG. 2 is a simplified block diagram of a telecommunications system, in accordance with an exemplary embodiment of the present invention.

Referring to the drawings, FIG. 2 is a simplified block diagram of an exemplary telecommunications system 10 in which exemplary embodiments of the present invention may be employed. In FIG. 2, connections that carry primarily bearer traffic are indicated by solid lines, and connections that carry primarily signaling traffic are indicated by dashed lines.

Telecommunications system 10 includes a circuit-switched network, such as public switched telephone network (PSTN) 12, and a packet-switched network 14. PSTN 12 may be connected to a variety of switching systems, including service switching points (SSPs), such as SSP 16, mobile switching centers (MSCs), and other switching systems. PSTN 12 may carry media in a pulse code modulation (PCM) format and may route calls using an out-of-band signaling system, such as Signaling System 7 (SS7). Various telephony devices, such as telephones, fax machines, or modems, may be able to use the switching systems connected to PSTN 12 to send and receive calls. For example, FIG. 2 shows a landline telephone 18 connected to SSP 16. Alternatively, telephony devices may send and receive calls wirelessly, for example, by using switching systems such as MSCs.

Packet-switched network 14 may include one or more local area networks (LANs) and/or one or more wide area networks (WANs), such as the Internet. Packet-switched network 14 may route packets based on network addresses, such as by using the Internet Protocol (EP) protocol in combination with the User Datagram Protocol (UDP) or Transmission Control Protocol (TCP). The IP packets may be carried over lower level protocols, such as asynchronous transfer mode (ATM) protocols. Packet-switched network 14 may carry voice and other media in a real-time packet format, e.g., using RTP. Packet-switched network 14 may also carry signaling, such as SIP signaling, that is used to set up real-time packet media sessions through packet-switched network 14.

A media gateway 20 allows for communication between PSTN 12 and packet-switched network 14. In particular, media gateway 20 may convey media between PSTN 12 and packet-switched network 14, converting between media formats. For example, media gateway 20 may convert between a PCM format used in PSTN 12 and an RTP format used in packet-switched network 14.

Media gateway 20 may be controlled by a media gateway control function (MGCF) 22, which may also serve as a signaling gateway between PSTN 12 and packet-switched network 14. Thus, MGCF 22 may convert between the signaling used in PSTN 12 (e.g., SS7 signaling) and the signaling used in packet-switched network 14 (e.g., SIP signaling). On the SS7 side, MGCF 22 may have a point code that is associated with one or more telephone numbers that can be called to reach interactive media services. Thus, a call placed to one of these telephone numbers, e.g., using telephone 18, may be routed to media gateway 20 through PSTN 12, e.g., using SS7 signaling. MGCF 22 may receive this SS7 signaling and responsively engage in further signaling (e.g., using SIP) to establish a real-time packet media session between media gateway 20 and another network element, e.g., via packet-switched network 14.

To provide interactive media services to the caller, the real-time packet media session may be established between media gateway 20 and a media resource function processor (MRFP) 24. MRFP 24 may, in turn, be controlled by a media resource function controller (MRFC) 26. MRFP 24 could be a network element, such as a media server, that includes one or more media resources. For example, MRFP 24 may include an automatic speech recognition (ASR) engine 28 that functions to receive speech in a real-time packet format and provide a textual interpretation of the speech, i.e., to convert speech into text. ASR 28 may also be to recognize other audio signals, such as DTMF tones. MRFP 24 may also include a text-to-speech (TTS) engine 30 that functions to transmit synthesized speech in a real-time packet format based text that is supplied to it, i.e., to convert text into speech. It is to be understood, however, that ASR 28 and TTS 30 are only exemplary media resources, as MRFP 24 could include other types of media resources. For example, MRFP 24 may include media resources for audio and/or video streaming, audio and/or video conferencing, playing and detecting DTMF tones, voice Web browsing, handwriting recognition, touch-screen detection/recognition/interaction, pressure or force detection/recognition/interaction, or fingerprint recognition. Such media resources could be multi-modal, i.e., may involve different media types.

MRFC 26 may function to control the media resources in MRFP 24. More particularly, MRFC 26 may understand the current state of each resource, keep track of which calls are in what state and using which resources, and allocate and de-allocate resources for each call, all in real time. For example, when a particular media resource, such as an ASR or TTS, is needed to provide an interactive media service to a caller, MRFC 26 may establish a real-time packet media session with that resource in MRFP 24, e.g., using SIP and SDP. During the session, MRFC 26 may control the media resource and receive event messages from the media resource, e.g., using MRCP.

MRFP 24 may also include a voice browser 32. As described in more detail below, voice browser 32 may function to interpret interactive applications and responsively invoke media resources in MRFP 24, so as to provide interactive media services to the caller. The interactive application may be written in the form of a VXML document, or in some other format.

To invoke a media resource, voice browser 32 in MRFP 24 may send a request message to MRFC 26, e.g., using MRCP. In response, MRFC 26 may establish a real-time packet media session with the appropriate resource (if the media session has not already been established) and then forward the request message to the media resource. MRFC 26 may also receive messages from media resources, such as event messages that indicate a change in state or the occurrence of a particular event. For example, once an ASR has recognized a spoken utterance from the caller, the ASR may generate an event message that the speech recognition process has been completed. MRFC 26 may forward such messages to voice browser 32 in MRFP 24.

In accordance with the IMS approach, MRFC 26 may be controlled by a call session control function (CSCF) 34. CSCF 34 controls sessions in packet-switched network 14, e.g., using SIP. Thus, when MGCF 22 receives SS7 signaling to route a call through media gateway 20, MGCF 22 may send a SIP INVITE message CSCF 34 to route the call to its destination. In the examples described herein, MRFP 24 is the call's destination. Thus, CSCF 34 may send a SIP INVITE message to MRFC 26, and MRFC 26 may forward the SIP INVITE message to MRFP 24. In this way, MGCF 22, CSCF 34, MRFC 26 and MRFP 24 may exchange SIP signaling to set up a real-time packet media session between media gateway 20 and MRFP 24.

In an exemplary embodiment, MRFP 24 is able to provide a plurality of different of interactive media services to callers by running a plurality of different interactive applications. Each interactive application may be associated with a call identifier. The call identifier could correspond to a called telephone number, i.e., the telephone number called by the caller to access the desired interactive media service. Alternatively, the call identifier could correspond to the originating telephone, trunk group, or other identifier of the call. The call identifier could be passed to MRFP 24 in the signaling used to set up the call. For example, the call identifier could be part of the Request-URI or included in some other field of the SIP INVITE message passed to MRFP 24. Voice browser 32 may then use the call identifier to obtain the appropriate interactive application, e.g., as a VXML document.

For example, telecommunications system 10 may include an application server 36, communicatively coupled to packet-switched network 14, that stores one or more interactive applications in a format such as VXML. Application server 36 may store each interactive application at a location that may be identified by a Universal Resource Locator (URL). Voice browser 32 may obtain an interactive application from application server 36, e.g., as a VXML document, by sending application server 36 an HTTP GET request with a URL associated with the interactive application. Alternatively, voice browser 32 may send the HTTP GET request with the URL to an intermediary node, such as a proxy server, gateway, or portal. The intermediary node may then retrieve the interactive application from application server 36 on behalf of voice browser 32 and forward it to voice browser 32.

In an exemplary embodiment, telecommunication system 10 also includes a location server 38 communicatively coupled to packet-switched network 14. Location server 38 may store the locations of interactive applications, e.g., URLs corresponding to application server 36, and keep track of what call identifiers are associated with what interactive applications. Thus, voice browser 32 may obtain the location of an interactive application by sending location server 38 a query that includes the call identifier associated with the interactive application. Location server 38 may then function as a redirection server. Thus, voice browser 32 may send location server 44 an HTTP GET request with the called telephone number or other call identifier, and location server 38 may respond with the URL of the interactive application stored on application server 36. Alternatively, location server 38 may function as a proxy server, gateway, or other type of intermediary, by retrieving the interactive application from application server 36 in response to an HTTP GET request that includes a call identifier associated with the interactive application.

Although FIG. 2 shows only one application server, telecommunication system 10 could include a plurality of application servers. Moreover, different interactive applications could be stored in different application servers. Location server 38 could be used to keep track of the locations of the interactive applications, and the locations could be keyed to the call identifiers associated with the interactive applications. In this way, voice browser 32 could send location server 38 a query that includes the telephone number called by the user (or other call identifier), and location server 38 could respond with a URL with which voice browser 32 can use to access the particular application server that has the interactive application associated with the call identifier.

3. Exemplary Operation

Figure 3:
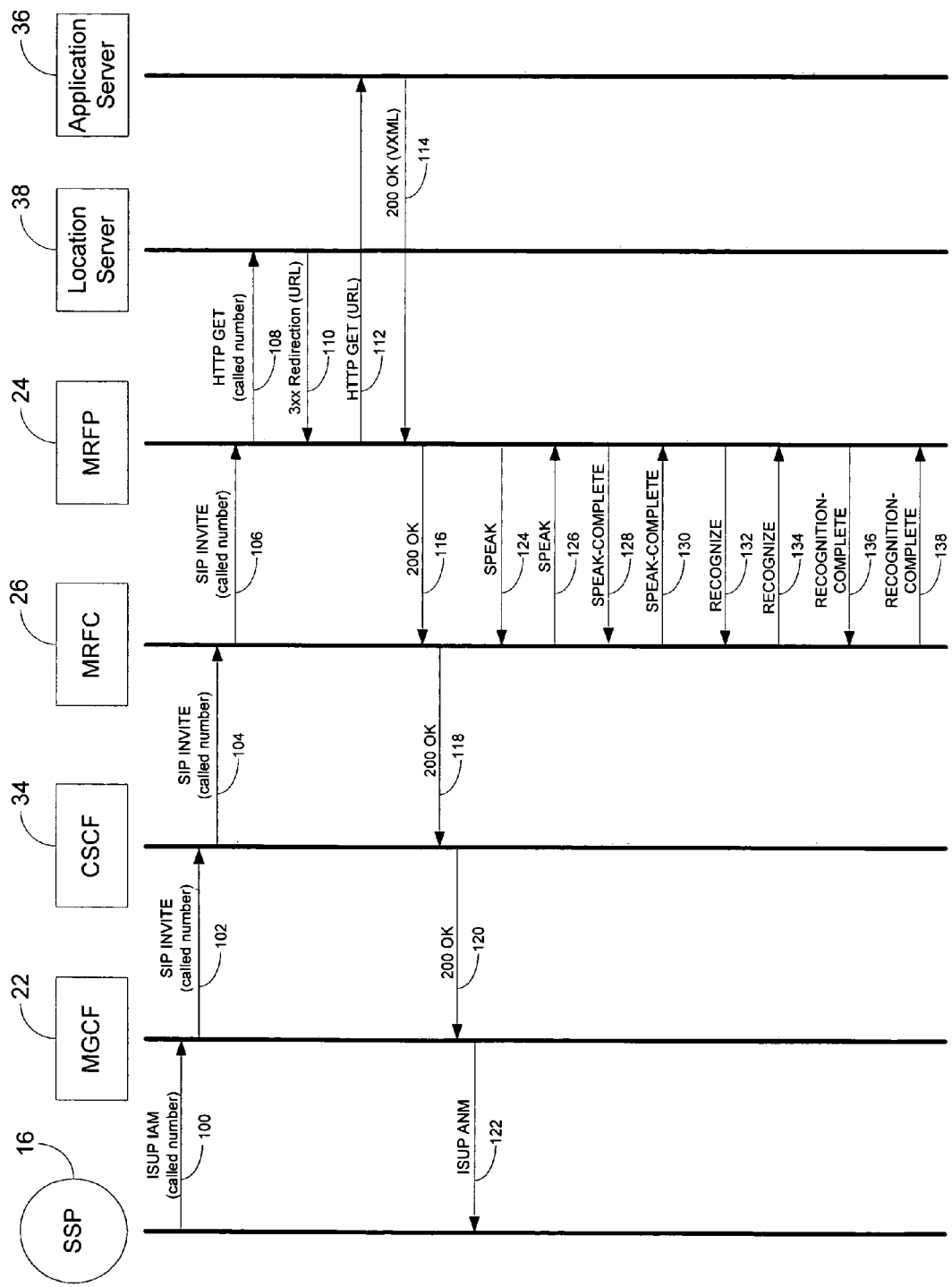
FIG. 3 is a simplified call flow diagram, in accordance with an exemplary embodiment of the present invention.

FIG. 3 is a simplified call flow diagram illustrating an exemplary method for using telecommunications system 10, as shown in FIG. 2, to provide an interactive media service to a caller. In the example illustrated in FIG. 3, SIP is used to set up communication sessions, HTTP is used to obtain the interactive application as a VXML document, and MRCP is used to control media resources. It is to be understood, however, that other protocols could be used for these functions. For example, the Media Server Control Markup Language (MSCML), Media Sessions Markup Language (MSML) and/or Media Objects Markup Language (MOML) could be used to control media resources instead of MRCP.

The process may begin when a caller, such as a user of telephone 18, dials a telephone number associated with an interactive media service. In response, SSP 16 transmits an SS7 ISUP IAM message that is received by MGCF 22, as indicated by step 100. For example, the called telephone number may translate to an SS7 point code of MGCF 22. The ISUP IAM message may include various call identifiers, such as the called telephone number.

In response to the ISUP IAM message of step 100, MGCF 22 may control media gateway 20 to receive the call through PSTN 12. MGCF 22 may also signal to CSCF 34 to determine how to route the call through packet-switched network 14. For example, MGCF 22 may send CSCF 34 a SIP INVITE message, as indicated by step 102. The SIP INVITE message may include an SDP block that describes the type of session being requested. The SIP INVITE message may also include a call identifier, such as the called telephone number. For example, the "To" field of the SIP INVITE message, which identifies the logical recipient of the request, may identify a URL that includes the called telephone number.

CSCF 34 may recognize from the call identifier that an interactive media service is being requested. Thus, CSCF 34 may send a SIP INVITE message to MRFC 26, as indicated by step 104. The SIP INVITE message of step 104 may include the call identifier. MRFC 26 may then send a SIP INVITE message with the call identifier to MRFP 24, as indicated by step 106.

MRFP 24 then obtains the interactive application, e.g., as a VXML document, associated with the called telephone number or other call identifier. To do this, MRFP 24 may query location server 38 to obtain the location of the interactive application. For example, MRFP 24 may send an HTTP GET request to location server 38, as indicated by step 108. The request includes the called telephone number or other call identifier, e.g., as part of a URL included in the request. Acting as a redirection server, location server 38 may respond with a 3xx Redirection response, as indicated by step 110. The response includes the URL of the interactive application associated with the called telephone number or other call identifier. In this case, the URL returned in step 110 corresponds to application server 36. MRFP 24 then sends an HTTP GET request with this URL to application server 36, as indicated by step 112. In response, application server 36 sends a 200 OK response that includes the interactive application in the form of a VXML document, as indicated by step 114.

Once MRFP 24 has successfully obtained the interactive application associated with the call identifier, MRFP 24 may respond to the SIP INVITE message by sending a 200 OK message to MRFC 26, as indicated by step 116. MRFC 26 may then send a 200 OK message to CSCF 34, as indicated by step 118, and CSCF 34 may send a 200 OK message to MGCF 22, as indicated by step 120. MGCF 22 may then send an SS7 signal, such as an ISUP ANM message, to SSP 16, as indicated by step 122. In this way, a circuit-switched connection, e.g., including one or more trunks, may be established between SSP 16 and media gateway 20 and a real-time packet media session may be established between media gateway 20 and MRFP 24. SSP 16 and media gateway 20 may then exchange media in a PCM format, and media gateway 20 and MRFP 24 may exchange media in a real-time packet format, e.g., using RTP.

During the real-time packet media session, voice browser 32 in MRFP 24 interprets the VXML document obtained from application server 36 and invokes media resources, such as TTS and ASR engines, through MRFC 26, in accordance with the interactive application. For example, MRFP 24 may send messages to MRFC 26 requesting actions by media resources, and MRFC 26 may allocate the appropriate media resources in MRFP 24 (e.g., using SIP and SDP). In this way, the VXML document may control the progress of the interactive application, through MRFC 26.

For example, the interactive application may call for certain text, as specified in the VXML document, to be spoken to the user. In response, MRFP 24 may send MRFC 26, an MRCP SPEAK message, with the speech text and other speech parameters, to invoke a TTS resource, as indicated by step 124. MRFC 26 may then determine whether a media session with a TTS resource in MRFP 24 has already been established for the call. If not, then MRFC 26 may establish the media session by sending a SIP INVITE message to MRFP 24 with an SDP block that specifies a TTS resource. Once the media session with the TTS resource is established, MRFC may forward the MRCP SPEAK message to MRFP 24, as indicated by step 126. The TTS resource may then synthesize the speech according to the text and transmit the speech in a real-time packet form.

When the TTS resource has completed the speech synthesis, MRFP 24 may transmit an MRCP SPEAK-COMPLETE message to MRFC 26, as indicated by step 128. MRFC 26 may then forward the MRCP SPEAK-COMPLETE message to MRFP 24, so as to reach voice browser 32, as indicated by step 130. In order to conserve media resources, MRFC 26 may also de-allocate the TTS resource used for the speech synthesis, e.g., by sending a SIP BYE message to MRFP 24 to end the media session with the TTS resource.

The interactive application may also call for speech recognition. In response, MRFP 24 may send MRFC 26 an MRCP RECONGIZE message, with a grammar and other parameters, to invoke an ASR resource, as indicated by step 132.

MRFC 26 may then determine whether a media session with an ASR resource in MRFP 24 has already been established for the call. If not, then MRFC 26 may establish the media session by sending a SIP INVITE message to MRFP 24 with an SDP block that specifies an ASR resource. Once the media session with the ASR resource is established, MRFC 26 may forward the MRCP RECOGNIZE message to MRFP 24, as indicated by step 134. The ASR resource may then receive real-time packets corresponding to speech from the user and attempt to recognize the speech.

When speech recognition is complete, MRFP 24 may send to MRFC 26, an MRCP RECOGNITION-COMPLETE message with a textual or other interpretation of the speech, as indicated by step 136. MRFC 26 may then forward the MRCP RECOGNITION-COMPLETE message to MRFP 24, so as to reach voice browser 32, as indicated by step 138. In order to conserve media resources, MRFC 26 may also de-allocate the ASR resource used for the speech recognition, e.g., by sending a SIP BYE message to MRFP 24 to end the media session with the ASR resource.

In this way, MRFP 24 may function within an IMS architecture to provide an interactive media service to the caller. In particular, MRFP 24 may control the progress of the interactive application and initiate events, e.g., to indicate that speech synthesis or speech recognition is complete. However, the messages to control the media resources pass through MRFC 26. Thus, MRFC 26 can still maintain control over the media resources, in accordance with the IMS approach.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. An interactive media system for providing interactive media services to a caller during a call from said caller to a called telephone number, comprising:
   a location server, said location server storing a location of an interactive application;
   an application server, said application server storing, at said location, said interactive application in a predetermined format;
   a media resource controller;
   at least one media resource; and
   a browser, said browser being configured to (i) receive said called telephone number, (ii) determine said location by sending said location server a request identifying said called telephone number, wherein said location server functions as a redirection server by identifying said location in response to said request, (iii) obtain said interactive application in said predetermined format from said application server by identifying said location, (iv) interpret said interactive application in said predetermined format and (v) responsively communicate with said media resource controller to invoke said at least one media resource in accordance with said interactive application.

2. The interactive media system of claim 1, wherein said browser and said at least one media resource are in a media resource processor.

3. The interactive media system of claim 1, wherein said at least one media resource includes at least one automatic speech recognition (ASR) engine.

4. The interactive media system of claim 1, wherein said at least one media resource includes at least one text-to-speech (TTS) engine.

5. The interactive media system of claim 1, wherein said predetermined format is a markup language.

6. The interactive media system of claim 1, wherein said browser is a voice browser and wherein said predetermined format is a voice extensible markup language (VXML).

7. A method of providing an interactive media service, said method comprising:
   a media resource processor receiving at least one call identifier;
   said media resource processor receiving a location from a location server in response to a first request, said first request identifying said at least one call identifier;
   said media resource processor receiving an interactive application from an application server in response to a second request, said second request identifying said location;
   a media resource controller establishing a real-time packet media session with said media resource processor;
   said media resource processor interpreting said interactive application and responsively sending messages to said media resource controller; and
   said media resource controller controlling said media resource processor during said real-time packet media session in accordance with said messages.

8. The method of claim 7, wherein said at least one call identifier includes a called telephone number.

9. The method of claim 7, wherein said media resource controller controlling said media resource processor during said real-time packet media session in accordance with said messages comprises:
   said media resource controller controlling an automatic speech recognition (ASR) engine of said media resource processor in accordance with said messages.

10. The method of claim 7, wherein said media resource controller controlling said media resource processor during said real-time packet media session in accordance with said messages comprises:
    said media resource controller controlling a text-to-speech (TTS) engine of said media resource processor in accordance with said messages.

11. The interactive media system of claim 1, wherein said location server identifies said location as a Universal Resource Locator (URL).

12. The interactive media system of claim 11, wherein said browser is configured to obtain said interactive application in said predetermined format from said application server by sending a HyperText Transfer Protocol (HTTP) GET request with said URL to said application server.

* * * * *